(12) United States Patent
Waatti

(10) Patent No.: US 7,556,492 B2
(45) Date of Patent: Jul. 7, 2009

(54) FOOTWEAR MOLD HEATING SYSTEM AND METHOD

(75) Inventor: Todd A. Waatti, Battleground, WA (US)

(73) Assignee: NIKE, Inc., Beaverton, OR (US)

( * ) Notice: Subject to any disclaimer, the term of this patent is extended or adjusted under 35 U.S.C. 154(b) by 285 days.

(21) Appl. No.: 11/269,848

(22) Filed: Nov. 9, 2005

(65) Prior Publication Data

US 2007/0102843 A1 May 10, 2007

(51) Int. Cl.
*B29C 43/52* (2006.01)
(52) U.S. Cl. .................. 425/407; 425/411; 425/414; 425/423
(58) Field of Classification Search ......... 425/407–408, 425/411–412, 415–416, 423
See application file for complete search history.

(56) References Cited

U.S. PATENT DOCUMENTS 3,897,190 A * 7/1975 Binzburg et al. ............ 425/383
4,233,006 A * 11/1980 Panas .......................... 425/407
4,698,001 A * 10/1987 Vismara ...................... 425/359
5,297,480 A * 3/1994 Miyashita et al. ............ 425/407
6,589,470 B2 * 7/2003 Fried et al. ................... 425/403
6,719,551 B2 * 4/2004 Polk, Jr. ...................... 425/377
2006/0051451 A1 3/2006 Hutchinson et al.

* cited by examiner

*Primary Examiner*—Yogendra Gupta
*Assistant Examiner*—Thu Khanh T Nguyen
(74) *Attorney, Agent, or Firm*—Banner & Witcoff, Ltd.

(57) ABSTRACT

Mold assemblies for compression molding of footwear components include molds, heating elements, conductor plates, insulating layers and carrier trays. An upper mold assembly is placed into a fixture attached to an upper press platen. A lower mold assembly slides into and out of a fixture attached to a lower press platen. Heating elements within the mold assemblies connect to electrical contacts in the fixtures when the mold assemblies are installed in the fixtures, thereby providing electrical power to the heating elements and heating the molds. A conveyor is positioned to receive a mold assembly from (or transfer a mold assembly to) the lower press platen fixture when the lower platen is in a lowered position.

15 Claims, 20 Drawing Sheets

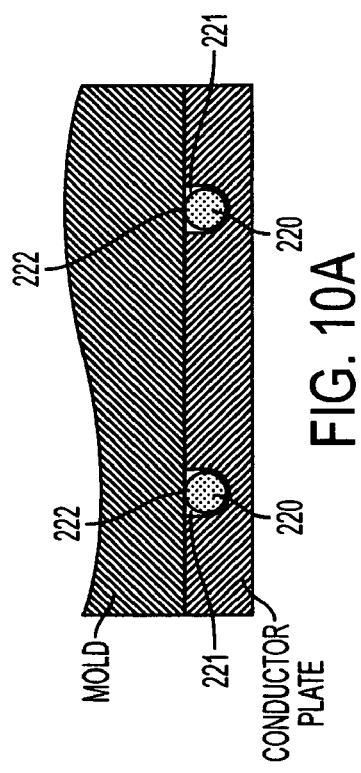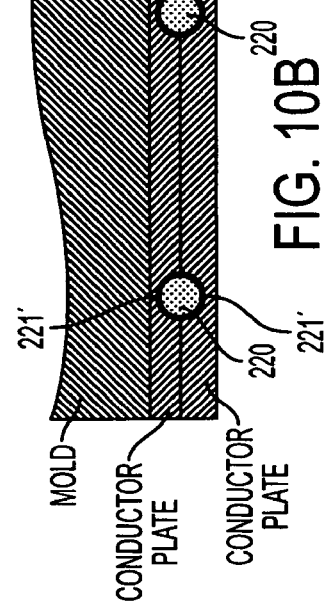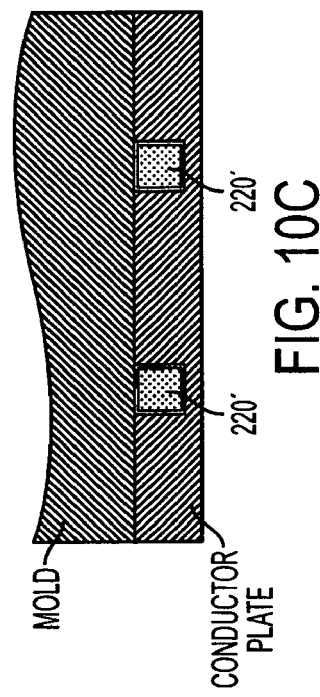

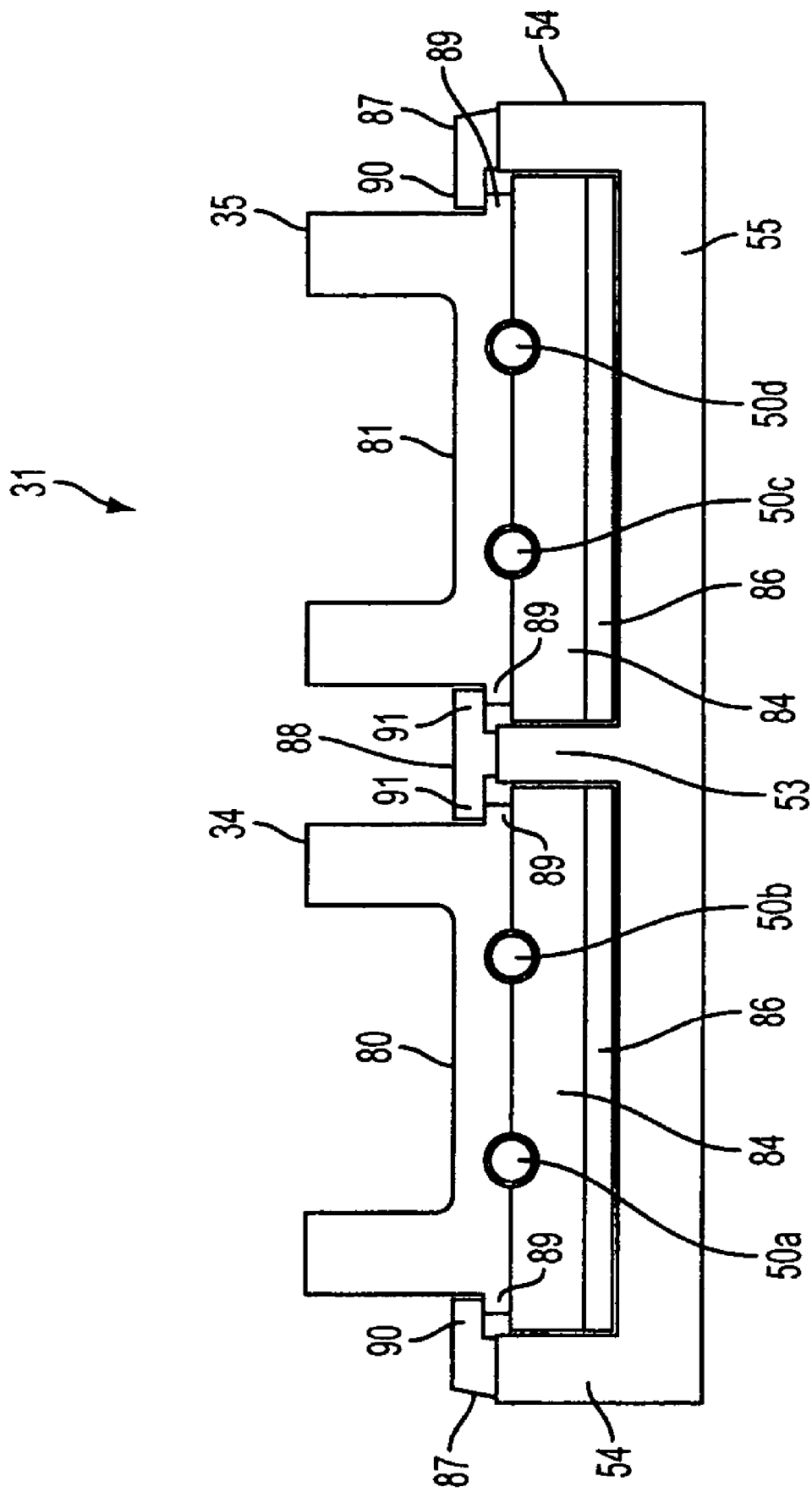

FOOTWEAR MOLD HEATING SYSTEM AND METHOD

TECHNICAL FIELD

At least some embodiments of the invention relate to equipment for compression molding footwear components and/or other articles. Embodiments of the invention also relate to methods for compression molding articles using such equipment.

BACKGROUND

Compression molding is a manufacturing process used to fabricate a large variety of articles. In compression molding, raw material is typically placed into an open cavity in a first portion of a mold. The raw material, which may be rubber or some other type of thermosetting material, is typically in solid form. The raw material may be a single piece, may be in multiple pieces, or may even be a powder. A second portion of the mold is then attached to (or otherwise placed into contact with) the first portion. As heat and pressure are applied, the raw material in the mold cavity is formed into the desired shape.

Compression molding is often used when manufacturing footwear. In particular, midsoles, outsoles, and various other footwear components are frequently formed from rubber, plastic and/or other materials which are heated and pressed into desired shapes. FIGS. 1A-1C are partially schematic drawings of a typical procedure for compression molding footwear components according to the prior art. FIG. 1A shows a first mold 2 and a second mold 3 for a pair of shoe outsoles. Cavities 4 and 5 are formed in first mold 2. The bottom of cavity 4 corresponds to a bottom surface of a left shoe outsole, and the bottom of cavity 5 corresponds to a bottom of a right shoe outsole. Second mold 3 includes a pair of protrusions 6 and 7 which respectively correspond to the top surfaces of the left and right shoe outsoles.

One or more pieces of the raw material(s) for the outsoles are placed into each of cavities 4 and 5. As shown in FIG. 11B, second mold 3 is then placed on first mold 2 so that protrusions 6 and 7 extend into cavities 4 and 5, with spaces between the protrusions and the cavity walls forming mold volumes corresponding to the outsoles being produced. As seen in FIG. 1C, the joined molds are then placed between two platens 8 and 9 of a press. Platens 8 and 9 are then heated by source(s) internal to the platens. Heat from platens 8 and 9 is transferred to molds 2 and 3 as platens 8 and 9 are pressed together. The pressure and heat is maintained for a time sufficient for the raw material to fill the mold volumes and to set. Depending upon the material(s) being used, this may be several minutes or more.

Conventional compression molding equipment and methods (such as those described above) can present challenges. So as to withstand the pressing forces, platens are often substantial structures which contain large masses of metal. In order to transfer sufficient heat to the molds, a significant amount of heat must be applied to the platens. The platens may also be wider and/or longer than the molds (as seen in FIG. 1C). In such a case, the platens may be heated in areas which are not in contact with (and thus do not transfer significant heat to) the molds. These configurations can thus be thermally inefficient. Moreover, a relatively long amount of time may be needed to transfer sufficient heat from the platens to the molds. In addition to being inconvenient, extended heating times can slow production.

Conventional arrangements may also limit the precision with which mold heating can be controlled. Different types of materials must be heated to different temperatures. Because the heat source is relatively far from the molds in the arrangement of FIG. 1C, heating the molds within a specific temperature range may be difficult. Moreover, different molds may have different internal geometries. For example, some molds may be thicker in certain regions, and therefore require more heat in those regions to reach a desired temperature. Heating sources within the platens are usually in a fixed (and sometimes unknown) configuration. It may therefore be impractical to rearrange those heating sources based on the geometry of a particular mold.

Conventional platen-mold systems can also require excessive time to cool. Some materials (e.g., Phylon) require that the mold cool before the platens are released from the mold. Excessive cooling times can thus slow production when using such materials.

Yet another challenge presented by conventional compression molding techniques relates to handling of a mold before (and/or after) the mold is pressed. For many types of footwear, significant time is needed to prepare a mold for production. For example, certain shoe outsoles are formed from multiple types of material. This may be for aesthetic reasons (e.g., color "pops" for forming multicolored outsoles), for structural reasons (e.g., to place a harder or softer material in certain outsole regions), or for other reasons. When preparing to mold such an outsole, separate pieces of different raw materials must be carefully placed at the proper locations in the mold. Trimming of raw materials may also be needed. Arrangements which enhance an operator's ability to prepare one mold while another is being heated and pressed can increase productivity.

SUMMARY

This summary introduces, in a simplified form, concepts that are further described below in the detailed description. This summary is not intended to identify key or essential features of the claimed subject matter, and is not intended to be used as an aid in determining the scope of the claims.

In at least some embodiments, heating elements are located near a mold and between platens used to press a mold and a mating mold together. Multiple molds and heating elements may be placed in a carrier tray to form a mold assembly. In some embodiments, mold assemblies may include a conductor plate which contacts the heating elements and the mold. The conductor plate, which may have a higher thermal conductivity value than the mold, spreads the heat from the heating elements. A layer of insulating material may also be placed between the conductor plate and the carrier tray.

In certain embodiments, a mold assembly is received within a fixture attached to a press platen. Heating elements within the mold assembly connect to electrical contacts in the fixture when the mold assembly is installed in the fixture, thereby powering the heating elements and heating the mold. In certain embodiments, separate mold assemblies are formed for upper and lower portions of mating molds. One of those mold assemblies is retained within a first fixture attached to a first press platen. Another of those mold assemblies slides into and out of a second fixture attached to a second press platen. A conveyor is positioned to carry the mold assemblies which slide into and out of the second platen.

BRIEF DESCRIPTION OF THE DRAWINGS

The foregoing summary, as well as the following detailed description of the preferred embodiments, is better understood when read in conjunction with the accompanying drawings, which are included by way of example, and not by way of limitation with regard to the claimed invention.

FIGS. 10A-10C show alternate configurations for positioning heating elements.

FIG. 11A is a cross-sectional view of a lower mold assembly.

DETAILED DESCRIPTION OF THE PREFERRED EMBODIMENTS

So as to provide a convenient example, embodiments of the invention are described by reference to a system configured to mold footwear outsoles. However, the invention is not limited to systems or methods for molding outsoles. In other embodiments, the invention includes systems and methods for molding midsoles, insoles, combined outsoles/midsoles, and other footwear components. Indeed, the invention is not limited to footwear, and includes embodiments in which other types of components can be molded.

Figure 1A:
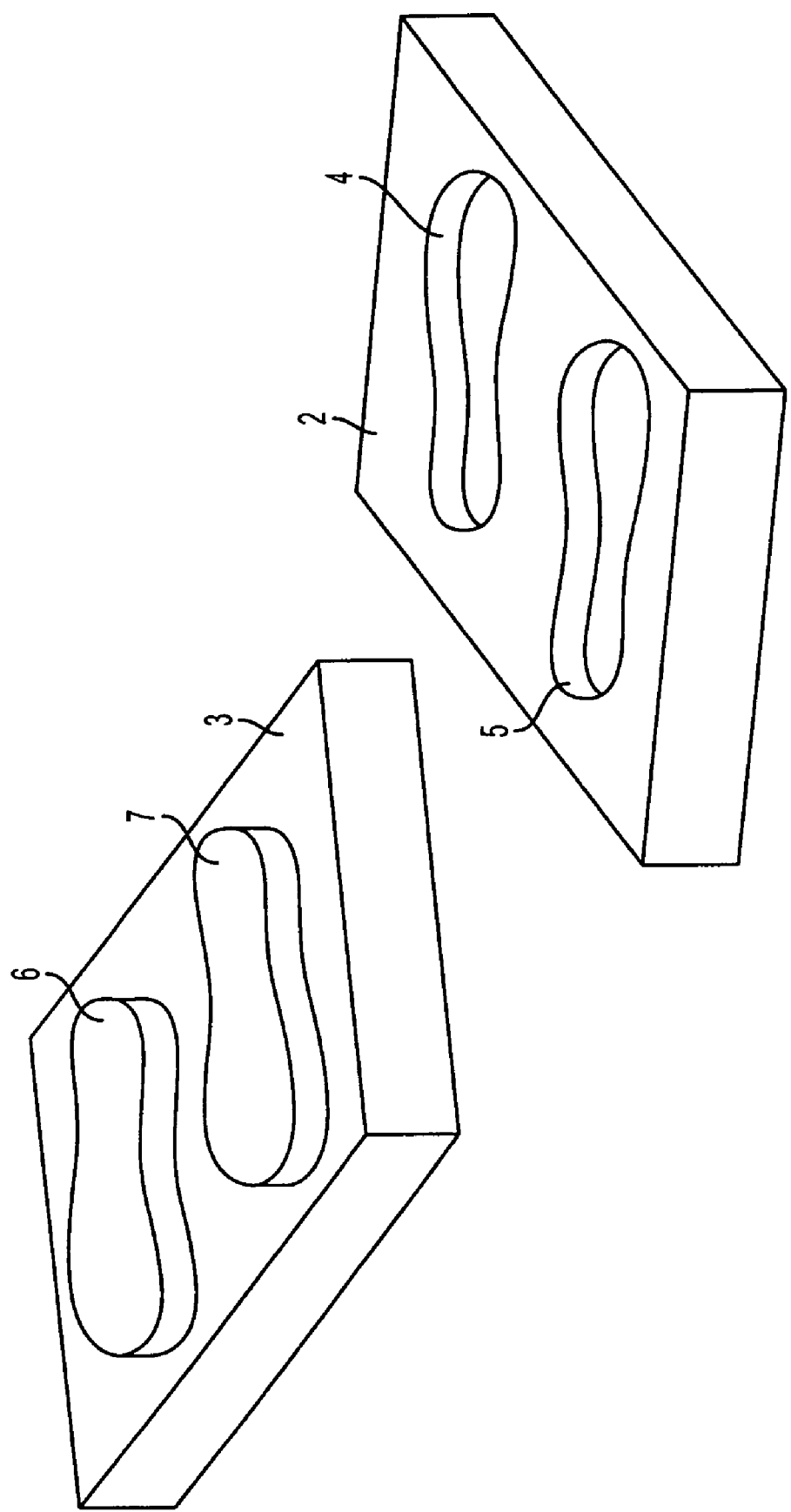
FIGS. 1A-1C are partially schematic drawings showing compression molding of footwear components according to a prior art arrangement.
Figure 1B:
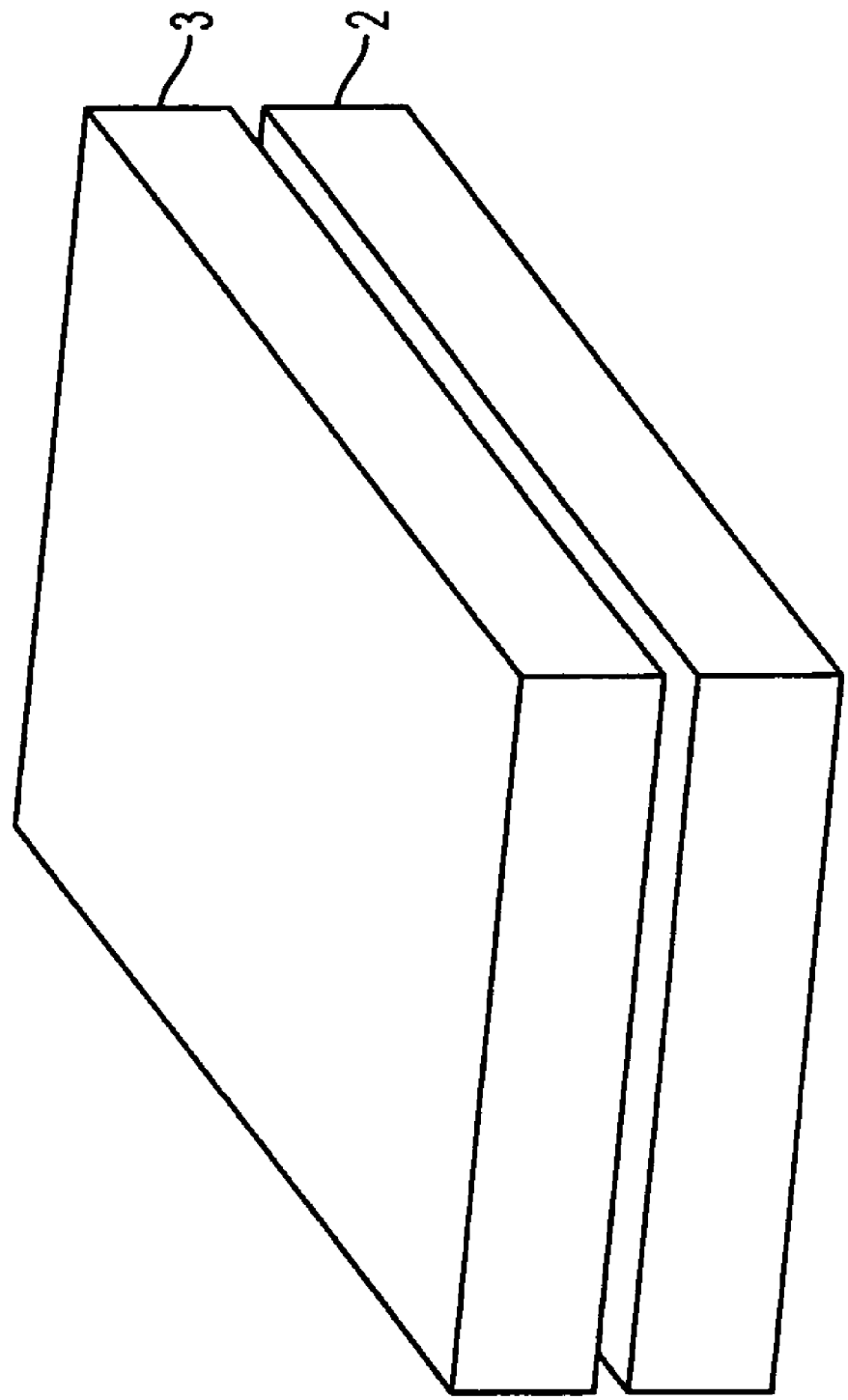
Figure 1C:
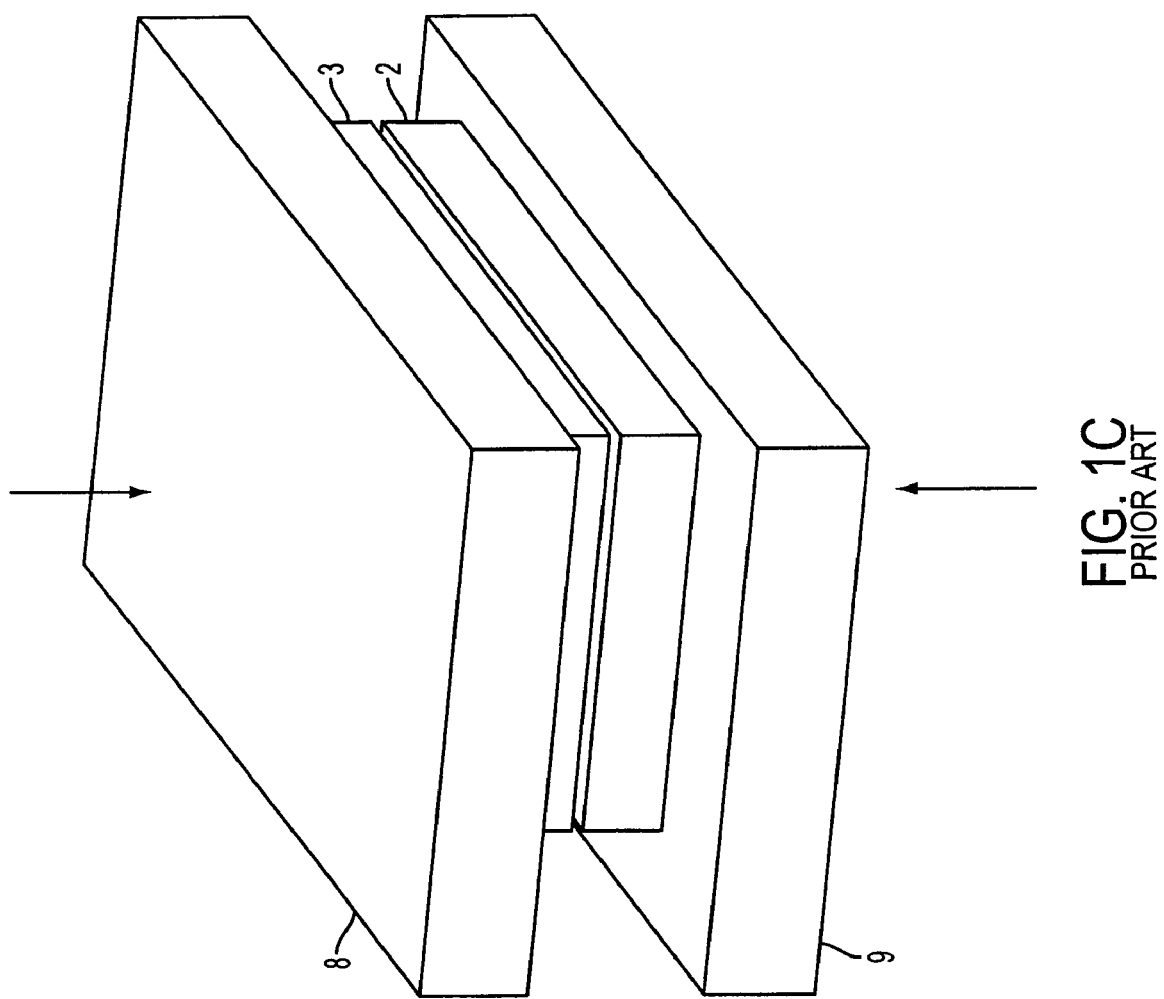
Figure 2:
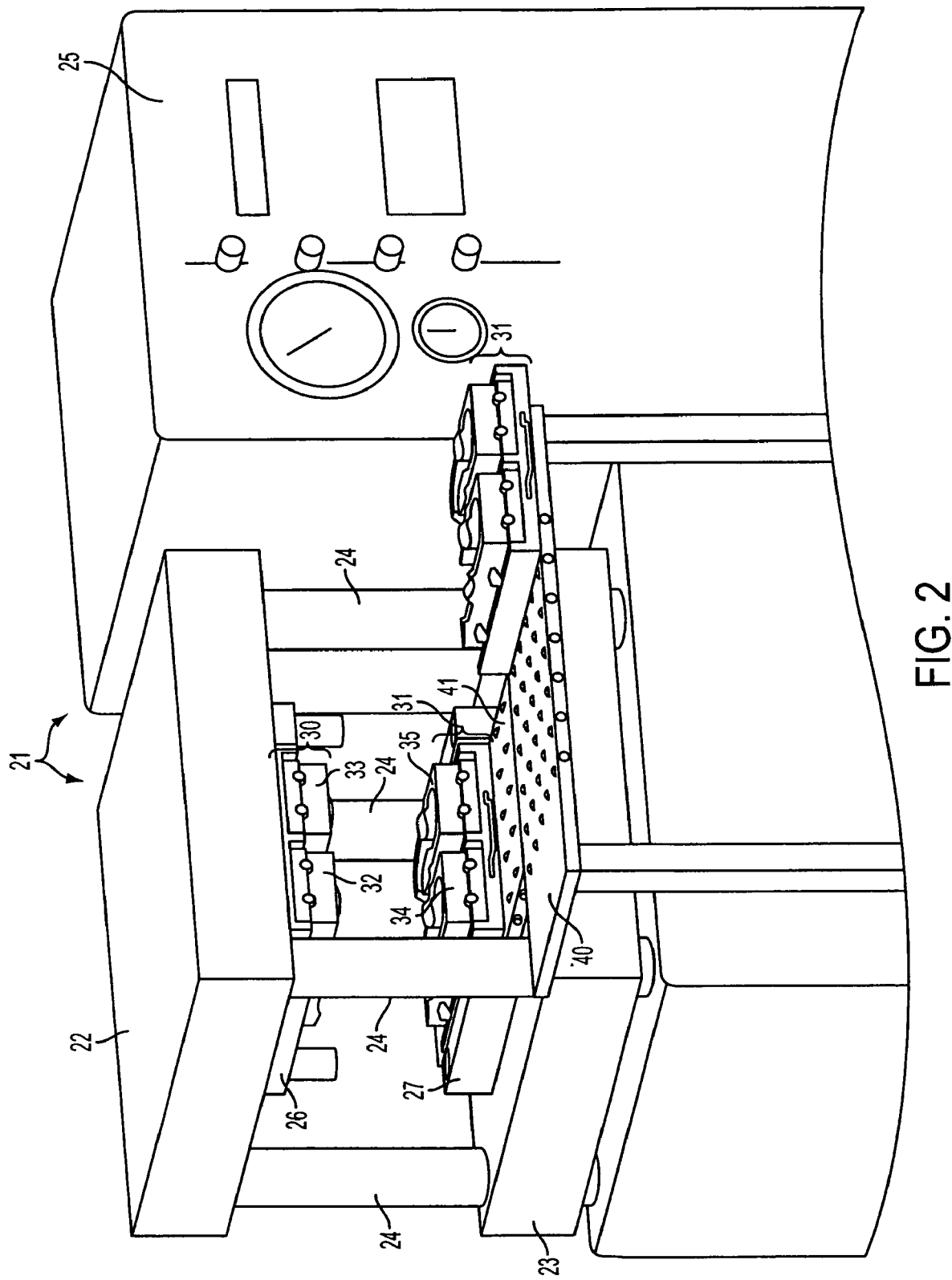
FIG. 2 shows a system for molding footwear components according to at least some embodiments.

FIG. 2 shows a system for molding footwear components according to at least some embodiments of the invention. Included in the system of FIG. 2 is a press 21. Press 21 includes an upper clamp plate 22 and a lower clamp plate 23. Clamp plates 22 and 23 move relative to one another so as to compress mating molds placed between clamp plates 22 and 23. In the depicted arrangement, upper plate 22 is stationary and lower plate 23 is moved toward upper plate 22 (along rails 24) by one or more hydraulic rams (not shown). The force of lower plate 23 in the direction of upper plate 22 is thereby transferred to compress mating molds placed between the upper and lower clamp plates. Instrumentation, power and control equipment for press 21 is contained inside a cabinet 25. It is to be noted that presses per se are well known and are commercially available from a variety of sources. Press 21 is intended to generically represent any of a variety of different types of equipment which can be employed to apply force between two surfaces. The invention is not dependent on the particular type of press which is utilized. Instead, embodiments of the invention can be implemented using any of a variety of different press types.

Although partially obscured in the view of FIG. 2, an upper positioning fixture 26 is attached to the underside of upper clamp plate 22. Similarly, a lower positioning fixture 27 is attached to lower plate 23. Fixture 26 and fixture 27 each receives and positions a mold assembly. The mold assemblies, which are described in more detail below, contain mold elements that are compressed together to produce one or more articles. In the present example, the mold assemblies are used to manufacture a pair of outsoles. In particular, upper fixture 26 positions an upper mold assembly 30. Upper mold assembly 30 includes upper molds 32 and 33. Lower fixture 27 positions a lower mold assembly 31, which includes lower molds 34 and 35. Lower molds 34 and 35 have mold cavities 80 and 81 (see, e.g., FIG. 3). Surfaces of cavities 80 and 81 respectively correspond to lower surfaces of left and right outsoles being produced. Upper molds 32 and 33 have protrusions 94 and 95 (see, e.g., FIG. 7), which respectively fit within cavities 80 and 81, and which respectively correspond to upper surfaces of left and right outsoles being produced. During a molding operation, movement of lower clamp plate 23 toward upper clamp plate 22 causes lower molds 34 and 35 to be moved into positions whereby protrusions 94 and 95 are respectively forced into cavities 80 and 81. Raw material in the mold volumes (i.e., the spaces between the protrusions and the cavity walls) is thereby subjected to pressure. The molds are simultaneously heated (as described below), and the raw material is formed into left and right outsoles.

As also seen in FIG. 2, the system can be used with a single upper mold assembly and multiple lower mold assemblies. Specifically, fixture 26 retains upper mold assembly 30 during multiple molding cycles. Conversely, lower fixture 27 may alternately receive a different one of several lower mold assemblies 31 during separate molding cycles. Lower mold assemblies 31 slide into and out of lower fixture 27 along conveyors 40 and 41. As described in more detail below, this permits an operator to prepare one lower mold assembly 31 while another lower mold assembly 31 is being pressed with upper mold assembly 30.

Figure 3:
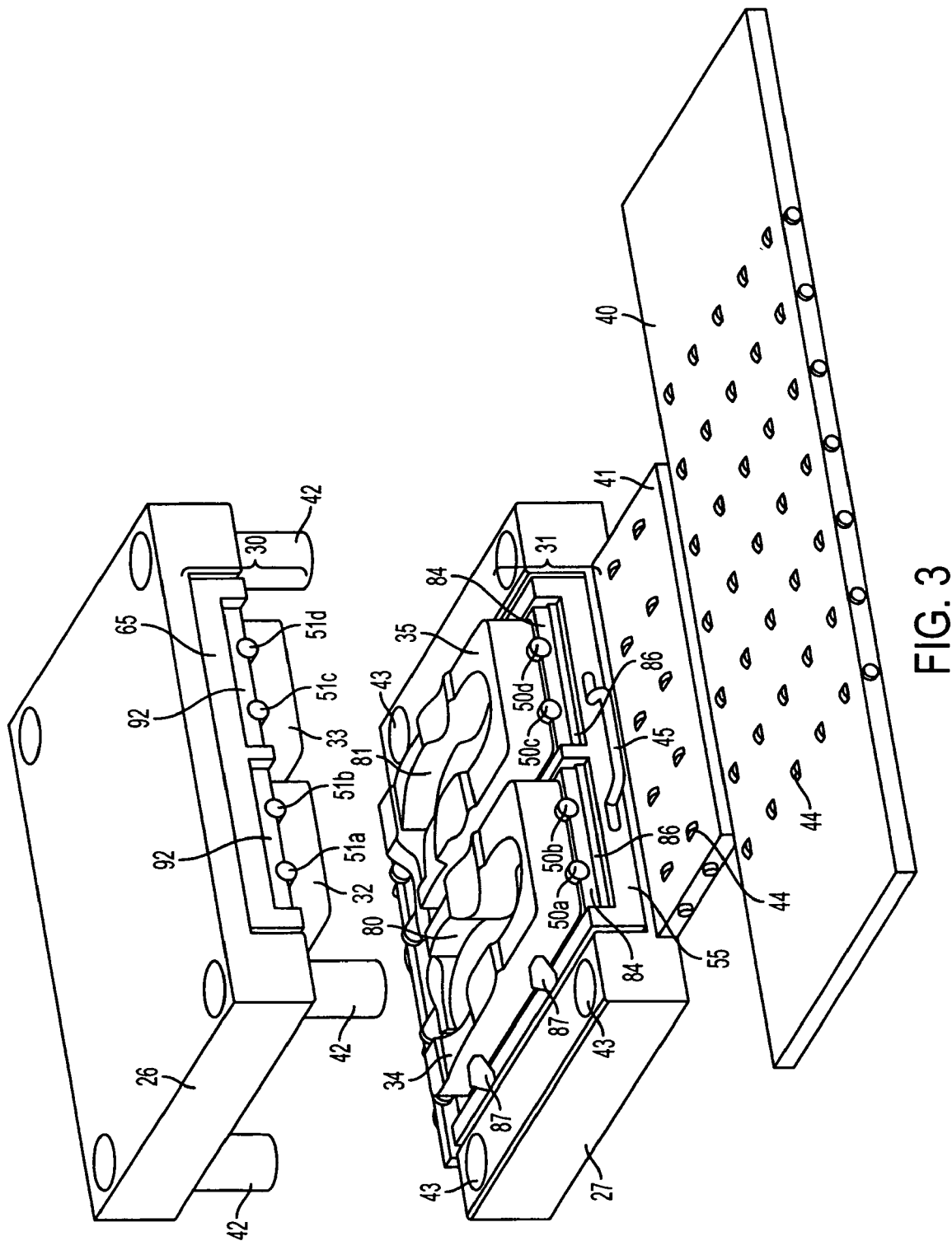
FIG. 3 is an enlarged front perspective view of various elements from the system of FIG. 2.

FIG. 3 is an enlarged front perspective view of upper and lower fixtures 26 and 27, upper and lower mold assemblies 30 and 31, and conveyors 40 and 41. For simplicity, clamp plates 22 and 23 and other aspects of the system are not shown. Upper fixture 26 includes multiple guide pins 42. Guide pins 42 are received in guide holes 43 of lower fixture 27 during a molding operation, and align upper fixture 26 with lower fixture 27. Conveyors 40 and 41 are positioned at a height corresponding to the position of a lower mold assembly 31 within lower fixture 27 when lower clamp plate 23 is in the down position (as shown in FIG. 2). In this manner, a lower mold assembly 31 can be readily removed from (or inserted into) lower fixture 27 by sliding lower assembly 31 over rollers 44 of conveyors 40 and 41. A handle 45 attached to a front edge of a carrier tray 55 of lower mold assembly 31 allows the lower mold assembly to be easily removed from lower fixture 27.

FIG. 3 also shows how at least some embodiments differ from conventional arrangements for compression molding of footwear components. Unlike previous arrangements which would have applied heat to molds 34 and 35 by heating press platens (such as upper and lower clamp plates 22 and 23), the heat source for heating molds 34 and 35 includes heating elements 50a-50d within lower mold assembly 31. Similarly, the heat source for molds 32 and 33 includes heating elements 51a-51d within upper mold assembly 30. Because the heat sources are between the clamp plates and closer to the molds, less metal must be heated. Accordingly, less time is required for heating the molds. Because a smaller amount of metal is heated, the molds can also cool more rapidly. Moreover, location of the multiple heat sources closer to the inner mold volume allows more precise control of molding temperatures.

Figure 4:
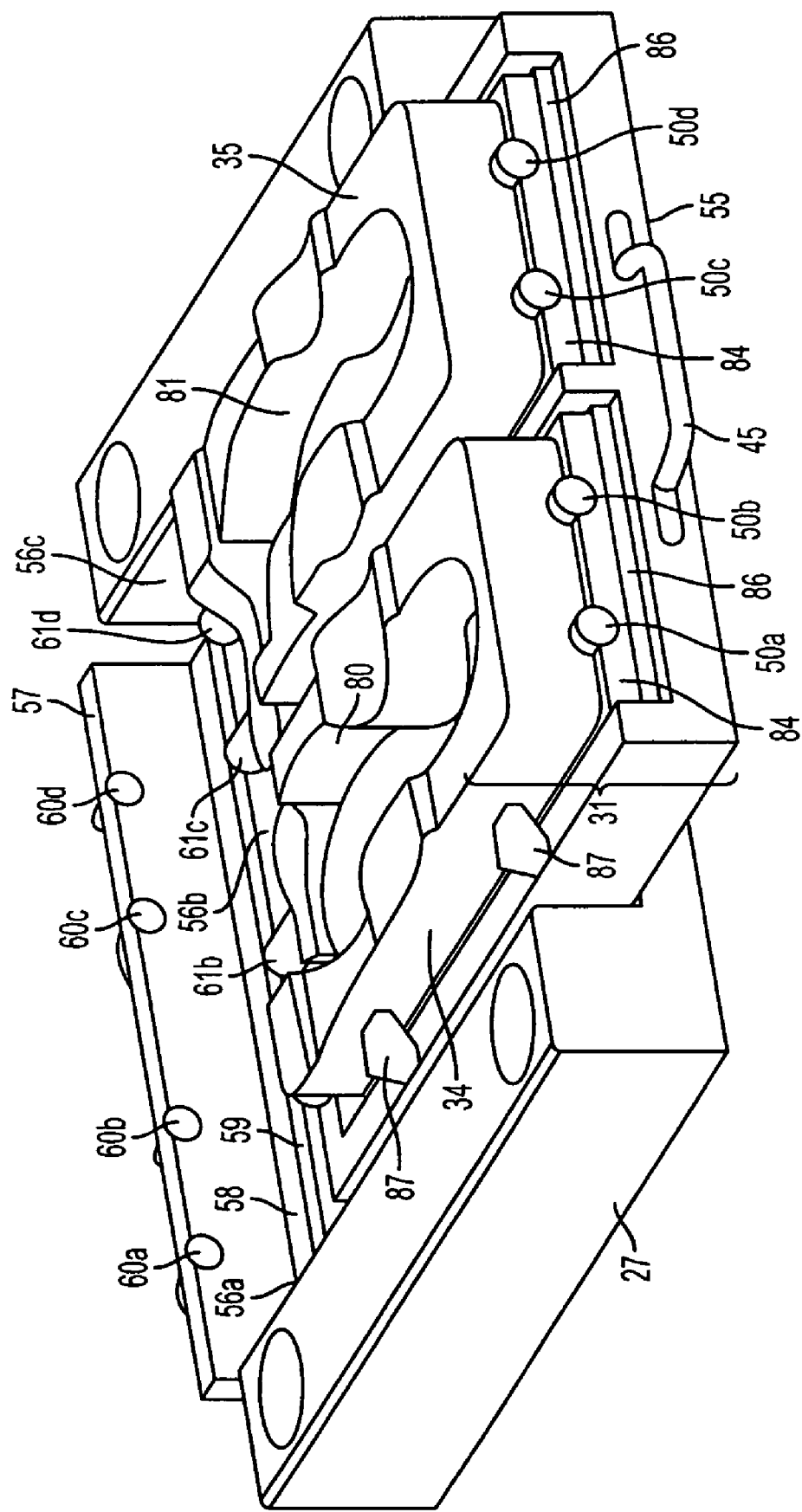
FIG. 4 shows a lower mold assembly partially withdrawn from a lower positioning fixture.

FIG. 4 shows lower fixture 27 with lower mold assembly 31 partially withdrawn. Other portions of the system are not shown. Lower carrier tray 55 of lower mold assembly 31 has an outer shape that fits within, and generally corresponds to, surfaces 56a (the inside surface of the left side wall of lower fixture 27), 56b (the inside bottom surface of fixture 27) and 56c (the inside surface of the right side wall of lower fixture 27). Bracket 57 is positioned at the rear of lower fixture 27, and includes a flange 58 having a front edge 59. When lower mold assembly 31 is slid into place within lower fixture 27, front edge 59 abuts the rear side of carrier tray 55 and prevents lower mold assembly 31 from sliding any further to the rear. In this manner, front edge 59 and surfaces 56a and 56c laterally position lower mold assembly 31 for a molding operation. Electrical connectors 60a-60d are also mounted on bracket 57. When lower mold assembly 31 is pushed into and is fully engaged within lower fixture 27, electrical connectors 60a-60d are respectively attached to mating connectors on the rear ends 61a-61d of heating elements 50a-50d (rear end 61a of heating element 50a is obscured in FIG. 3). Electrical power is then supplied to heating elements 50a-50d through connectors 60a-60d. For simplicity, electrical connectors 60a-60d are shown generically in the drawings, and mating connectors on rear ends 61a-61d are omitted. Various types of commercially available electrical connectors can be used for electrical connectors 60a-60d and for mating connectors on rear ends 61a-61d. Additional details of heating elements 50a-50d, of electrical connections to those heating elements, and of heating element operation are provided below in conjunction with FIG. 9.

Figure 5:
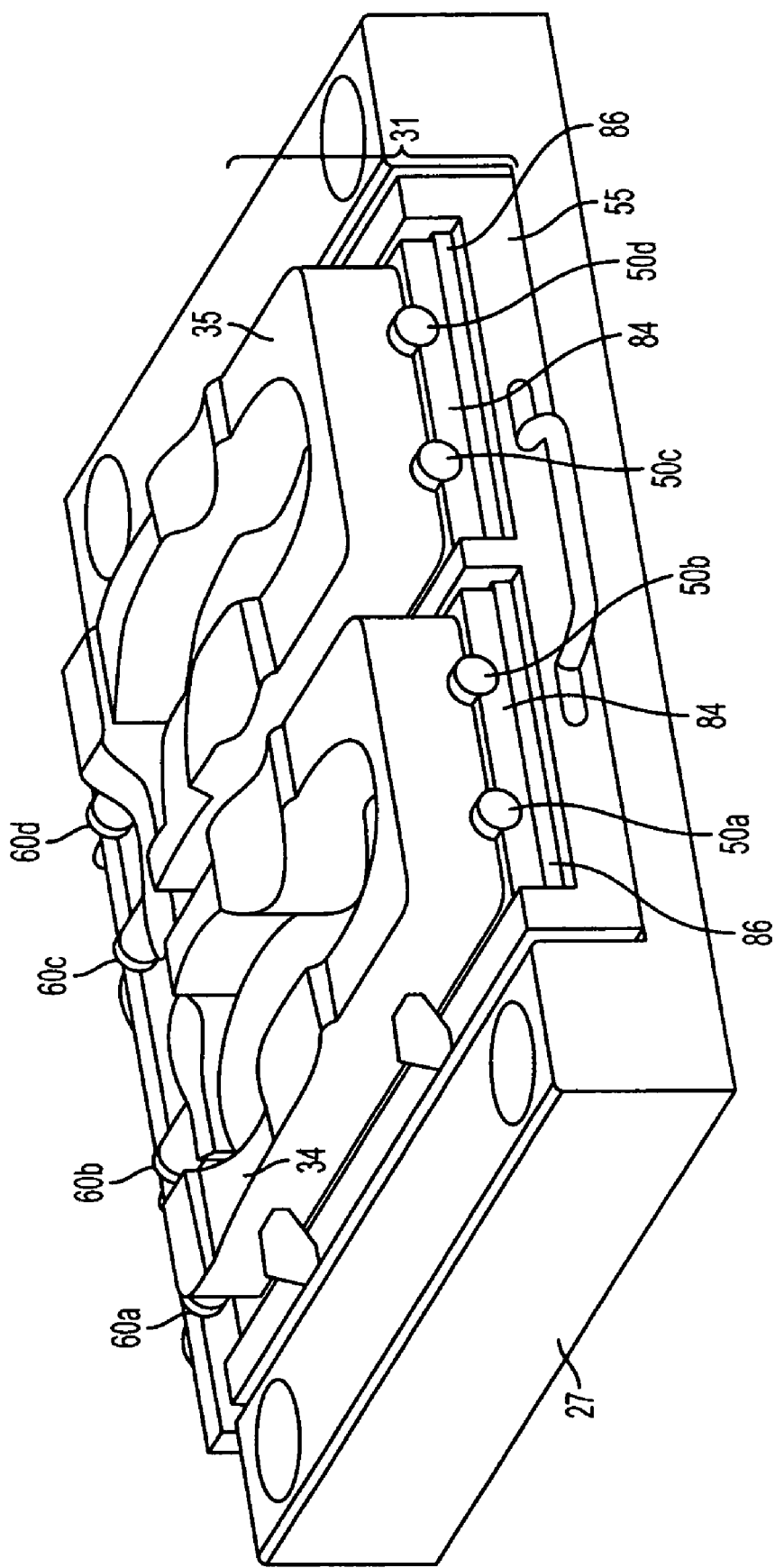
FIG. 5 shows a lower mold assembly fully engaged in a lower positioning fixture.
Figure 6:
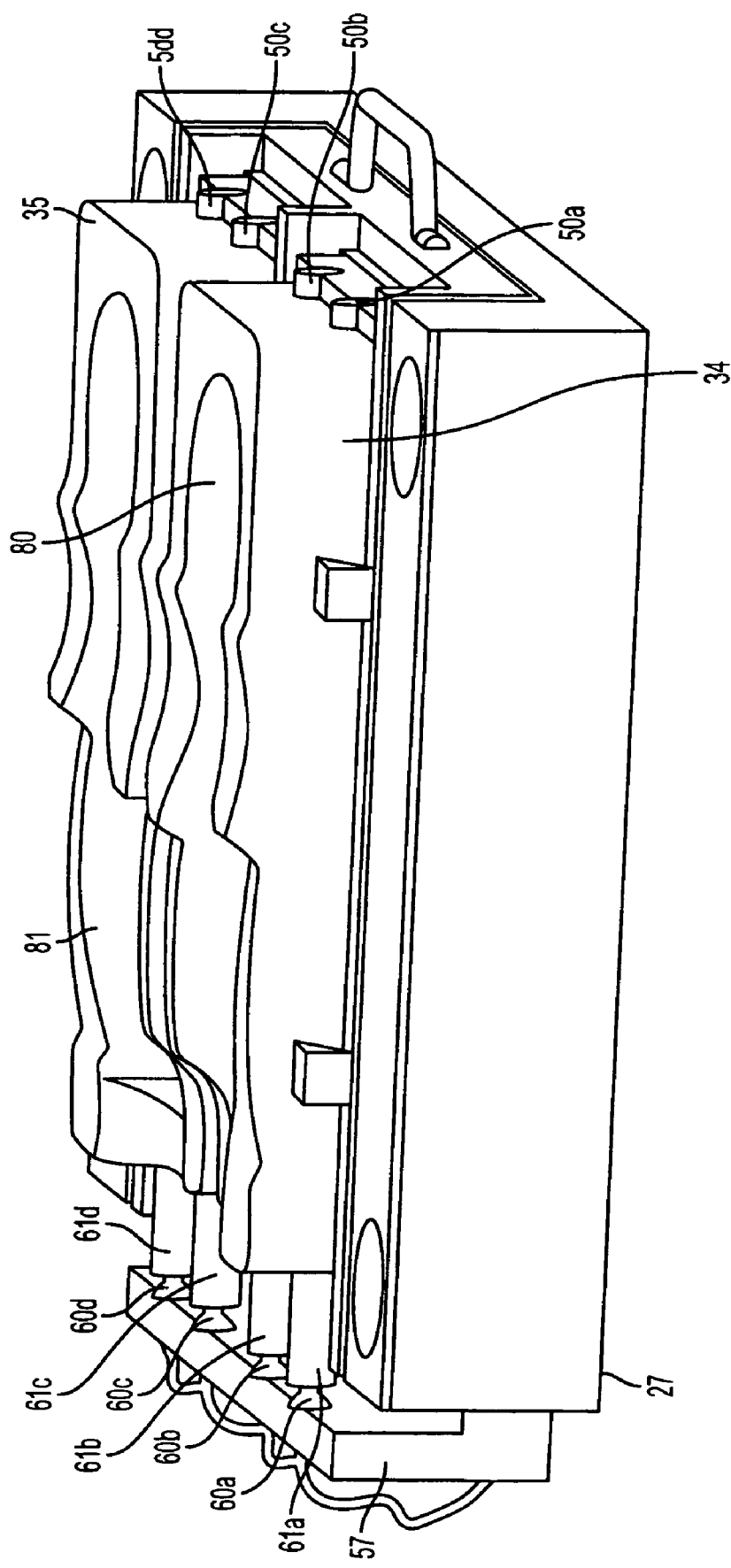
FIG. 6 is a side perspective view of a lower mold assembly fully engaged in a lower positioning fixture.

FIG. 5 shows lower mold assembly 31 fully engaged within lower fixture 27. In this configuration, electrical connectors 60a-60d are joined to mating connectors on rear ends 61a-61d of heating elements 50a-50d. As in FIGS. 3 and 4, other portions of the system are omitted. FIG. 6 is a left side perspective view of lower mold assembly 31 when fully engaged within lower fixture 27. Other portions of the system have also been omitted from FIG. 6.

Figure 7:
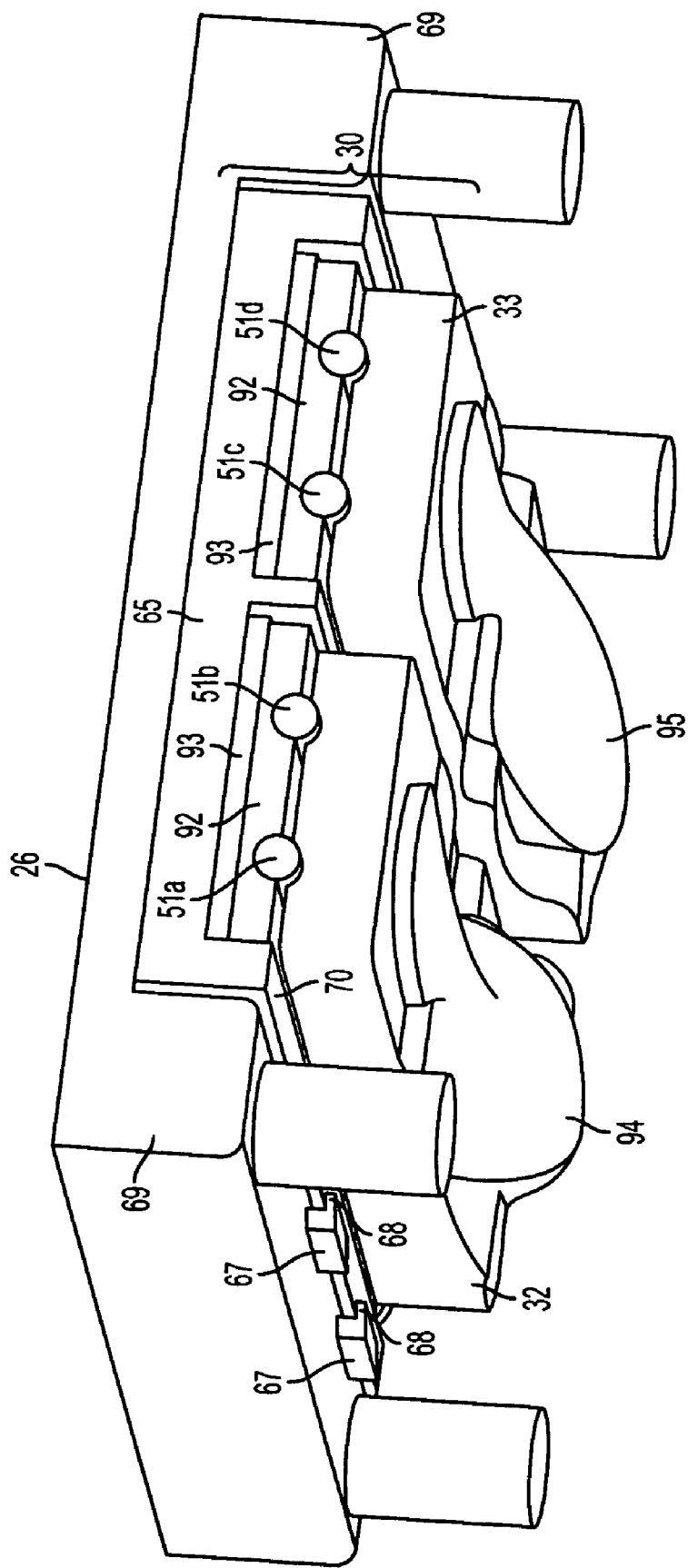
FIG. 7 is a lower front perspective view of an upper mold assembly secured in an upper positioning fixture.

FIG. 7 is a lower perspective view of upper mold assembly 30 secured in upper fixture 26, and with other components of the system omitted. As with lower mold assembly 31 and lower fixture 27, upper mold assembly 30 includes a carrier tray 65. Although not included in the embodiment of FIG. 7, carrier tray 65 could also include a handle similar to handle 45 (see FIG. 4). Carrier tray 65 has an outer shape that fits within, and generally corresponds to, inside surfaces 66a-66c of upper fixture 26 (see FIG. 8). Upper mold assembly 30 is retained within upper fixture 26 so that upper mold assembly 30 remains in position when lower clamp plate 23 is moved downward and the mold assemblies 30 and 31 are no longer engaged. Upper mold assembly 30 is secured within upper fixture 26 by brackets 67 (only brackets 67 on left side wall 69 are visible in FIG. 7). Each bracket 67 is bolted on a side wall 69 of upper fixture 26 so that an ear 68 extends over a side wall 70 of carrier tray 65. The upper mold assembly can be secured within the upper fixture in numerous other manners. In some embodiments, for example, tongues formed on the sides of the upper tray slide into (and are held within) grooves formed in the inside surfaces of the upper fixture side walls.

Figure 8:
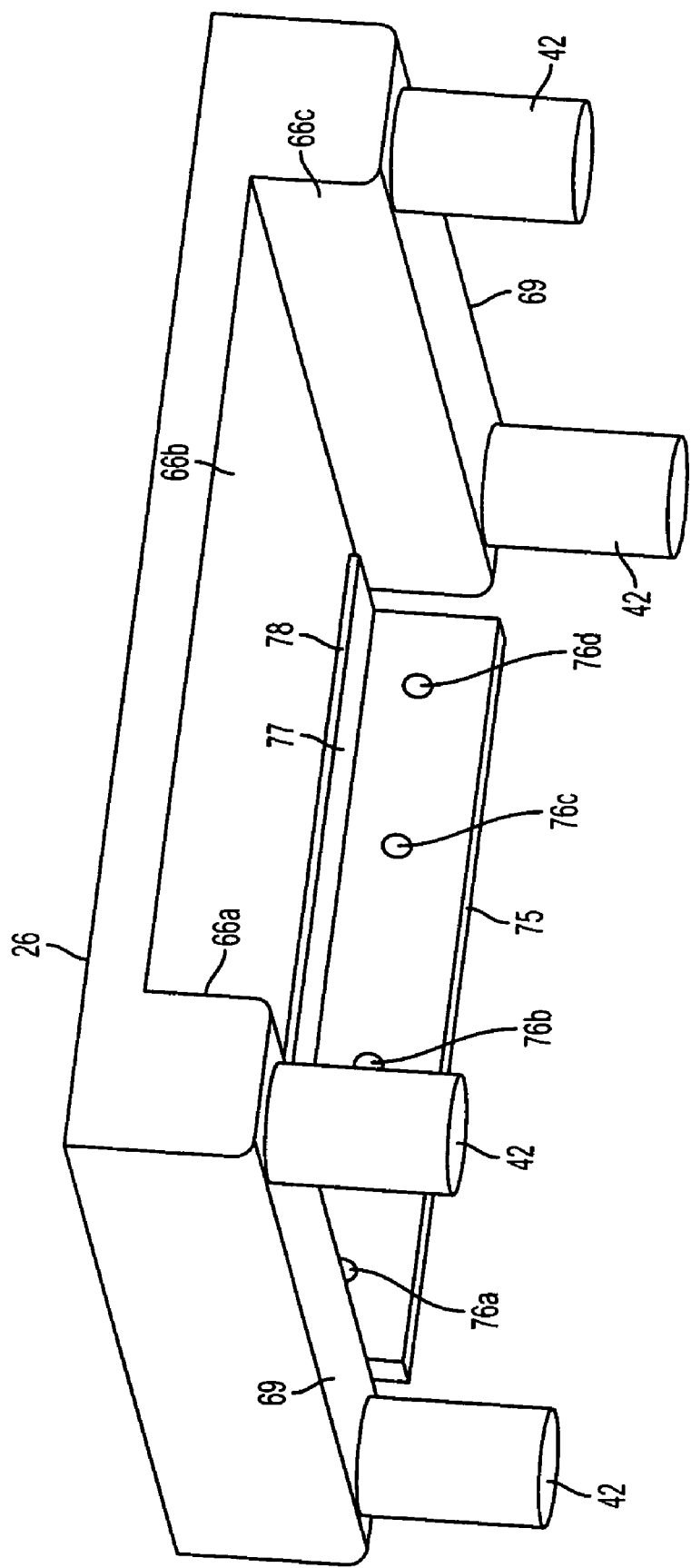
FIG. 8 is a lower front perspective view of an upper positioning fixture.

FIG. 8 is similar to FIG. 7, but with upper mold assembly 30 removed. Similar to lower fixture 27, upper fixture 26 includes a bracket 75 having electrical connectors 76a-76d. When upper mold assembly 30 is installed in upper fixture 26 (as shown in FIG. 7), connectors 76a-76d are respectively attached to mating connecters on rear ends (not shown) of heating elements 51a-51d. Electrical power is supplied to heating elements 51a-51d through connectors 76a-76d. Additional details of heating element operation are provided below. Bracket 75 includes a flange 77 having a front edge 78. When upper mold assembly 30 is placed in upper fixture 26, front edge 78 abuts the rear side of carrier tray 65 and prevents upper mold assembly 30 from sliding any farther to the rear. In this manner, front edge 78 and the inside surfaces 66a, 66c of side walls 69 laterally position upper mold assembly 30 for a molding operation.

Figure 9:
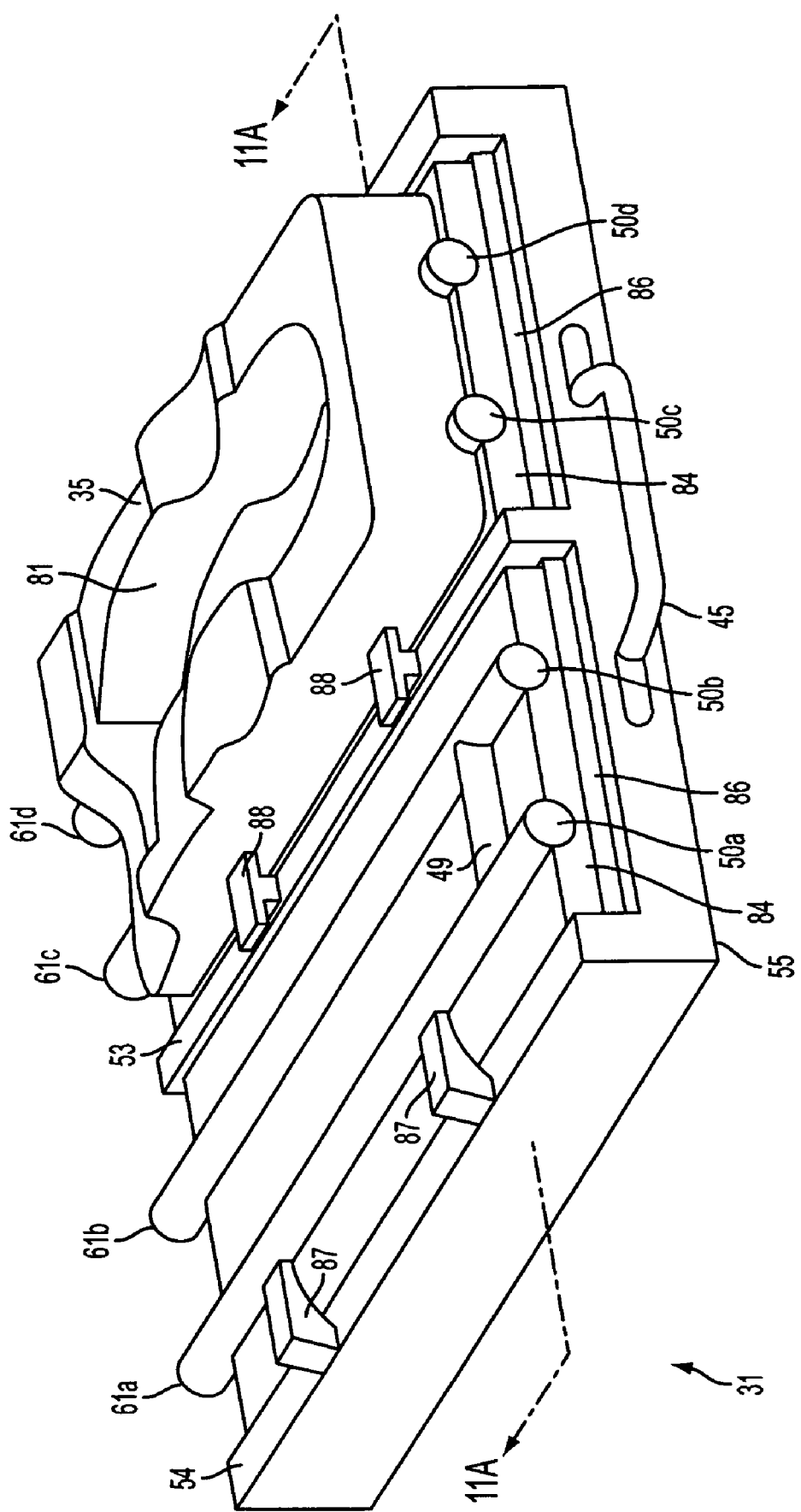
FIG. 9 is a front perspective view of a lower mold assembly with one mold removed.

FIG. 9 is a front perspective view of lower mold assembly 31 with mold 34 removed to reveal additional details of the arrangement of various elements within assembly 31. As previously indicated, molds 34 (not shown in FIG. 9) and 35 have cavities 80 and 81. Surfaces of cavities 80 and 81 correspond to the lower surfaces of outsoles being molded. Molds 34 and 35 may be formed from steel, aluminum or other type of metal conventionally used for compression molds. Heating elements 50a-50d are situated directly under mold elements 34 and 35. In the embodiment shown, each of heating elements 50a-50d is an electrically powered cartridge heater. Cartridge heaters, which are well known and commercially available from numerous sources, generate heat when supplied with electric power. Each of heating elements 50a-50d receives power through an electrical connector (not shown) on its respective rear end 61a-61d. The connectors on rear ends 61a-61d join to connectors 60a-60b (see FIG. 6). In at least some embodiments, each cartridge heater includes a female two-lead connector, and each of connectors 60a-60b is a two-lead male connector. As with cartridge heaters, such connectors are well known and available from numerous sources. In other embodiments, however, electrical power is provided to the heating elements in other manners. As but one example, each of the heating elements may have two exposed terminals at its rear end. Individual electrical wires are connected to those terminal with alligator clips, by bolting of wire ends onto terminal posts, or in some other manner.

In the embodiment of FIG. 9, and as previously described, connectors on ends 61a through 61d are joined to connectors 60a-60d when mold assembly 31 is slid into position within lower fixture 27. Connectors 60a through 60d (see FIGS. 4-6) are in turn wired to a power supply. A rheostat or similar device (not shown) can be used to adjust the amount of power provided to the heating elements via connectors 60a through 60d, and thus adjust the amount of heat produced by the heating elements.

Lower mold assembly 31 further includes conductor plates 84. In at least some embodiments, conductor plates 84 are formed from brass, bronze or some other material having a heat conductivity value which is higher than that of molds 34 and 35. This permits heat from the heating elements 50a through 50d to be spread more evenly and more quickly across the molds. In the embodiments shown, the heating elements are cylindrical in shape. Half-round recesses are formed in conductor plates 84 and in the outer surfaces of molds 34 and 35 to hold the heating elements and to place the outer surfaces of the heating elements in direct contact with the conductor plates and the molds. In other words, the shapes of the half round recesses and of the heating elements are complementary. The half-round recesses can be cast into molds 34 and 35 (using, e.g., methods similar to those described in provisional U.S. patent application Ser. No. 60/644,512, filed Jan. 19, 2005 and incorporated by reference herein). The recesses could alternately be milled or formed in some other manner.

As further shown in FIG. 9, a locator 49 is positioned between heating elements 50*a* and 50*b*. Locator 49 is cylindrical and rests within a complementary half-round recess in conductor plate 84. A complementary half-round corresponding to locator 49 is also formed in the outer surface of mold 34. A similar locator is positioned between heating elements 50*c* and 50*d*, and rests within complementary recesses in mold 35 and in the conductor plate 84 under mold 35. These locators, which may be simple metal rods, serve to correctly position molds 34 and 35 relative to conductor plates 84 and prevent the molds and conductor plates from sliding relative to one another along the length of the heating elements. In other embodiments, locators may be formed in a different manner (e.g., a stub formed on a mold and a corresponding depression formed on a conductor plate) or omitted.

FIGS. 10A-10C show alternate manners in which the heating elements may be arranged with regard to other portions of a mold assembly. Each of FIGS. 10A through 10C is a transverse cross section of a mold, conductor plate(s) and heating elements. In FIG. 10A, heating elements 220 rest within recesses 221 such that the upper surfaces 222 of heating elements 220 are in contact with the outer surface of the mold, but with almost all of the heating elements inside of recesses 221. Although potentially less thermally efficient than the arrangement of FIG. 9, the arrangement of FIG. 10A does not require recesses in the mold. In FIG. 10B, heating elements 220 are placed between two vertically-superimposed conductor plates, with each of those conductor plates having complementary half-round recesses 221' formed therein. In FIG. 10C, heating elements 220' having square cross sections are used. In each of the arrangements of FIGS. 10A-10C, locators between the conductor plate and the mold (and/or between the conductor plates in FIG. 10B) can be included.

Returning again to FIG. 9, lower mold assembly 31 also includes layers of insulating material 86 between conductor plates 84 and carrier tray 55. In at least some embodiments, insulating material 86 is formed from a material having a thermal conductivity value which is lower than the thermal conductivity value of the material from which carrier tray 55 is formed. Examples of materials which can be used for insulating material 86 include glass-reinforced polymer composite insulator sheets available from D-M-E Co. of Madison Heights, Mich. and the product sold under the name GLAS-THERM by Monoco, Inc. of Grand Rapids, Mich. Insulating material 86 (which can be, e.g., approximately 0.25 inches thick) permits more of the heat from the heating elements to be directed to molds 34 and 35.

Molds 34 and 35, heating elements 50*a*-50*d*, locators 49, conductor plates 84 and layers of insulating material 86 are held in place with brackets 87 and 88. FIG. 11A is a cross-section of lower mold assembly 31 taken from the location shown in FIG. 9, and with mold 34 included. As seen in FIG. 11A, molds 34 and 35 include flanges 89 formed along their sides. For purposes of drawing simplification, flanges 89 are not depicted in other drawing figures. As with the half-round recesses in molds 34 and 35 previously described in connection with FIG. 9, flanges 89 can be cast into molds 34 and 35 or formed by milling or other technique. Brackets 87 are bolted to side walls 54 of lower carrier tray 55. Each bracket 87 includes an ear 90 which retains a flange 89. Brackets 88 are bolted to center divider 53, and include ears 91 which retain flanges 89.

Figure 11B:
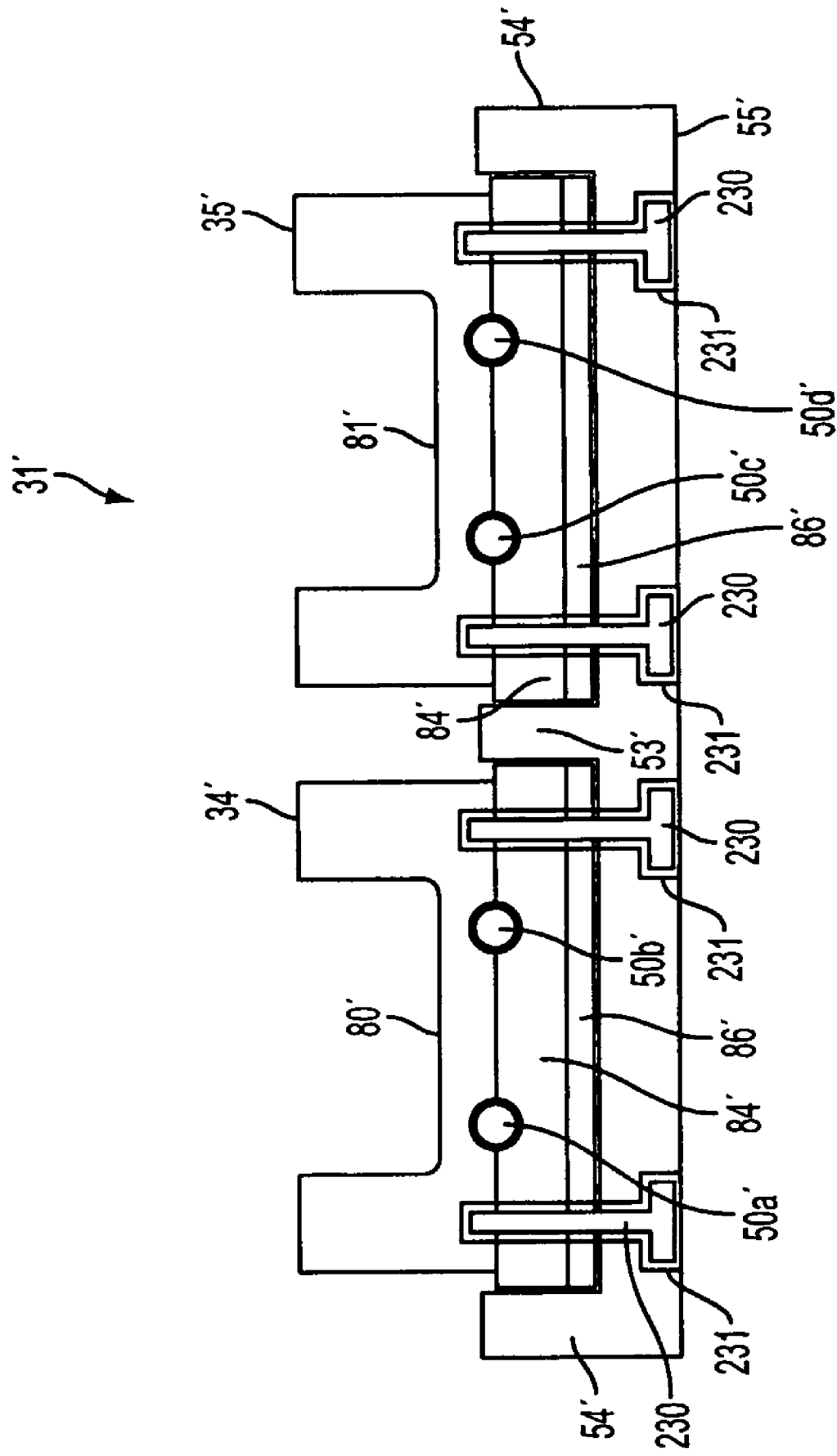
FIG. 11B is a cross-sectional view of a lower mold assembly according to another embodiment.

In other embodiments, the components of a mold assembly are secured together in other manners. For example, bolts could be used instead of brackets such as brackets 87 and 88 in FIG. 11A. FIG. 11B is a cross section of a lower mold assembly according to another embodiment, and taken from a location similar to that shown in FIG. 9. Similar components in FIGS. 11A and 11B have similar reference numbers, but include an added apostrophe (e.g., mold assembly 31' in FIG. 11B vs. mold assembly 31 in FIG. 11A). In the embodiment of FIG. 11B, bolts 230 are inserted through countersunk holes 231 in tray 55'. Bolts 230 pass through corresponding holes in insulating material layers 86' and conductor plates 84', and engage threads in corresponding holes in molds 34' and 35'.

Figure 12:
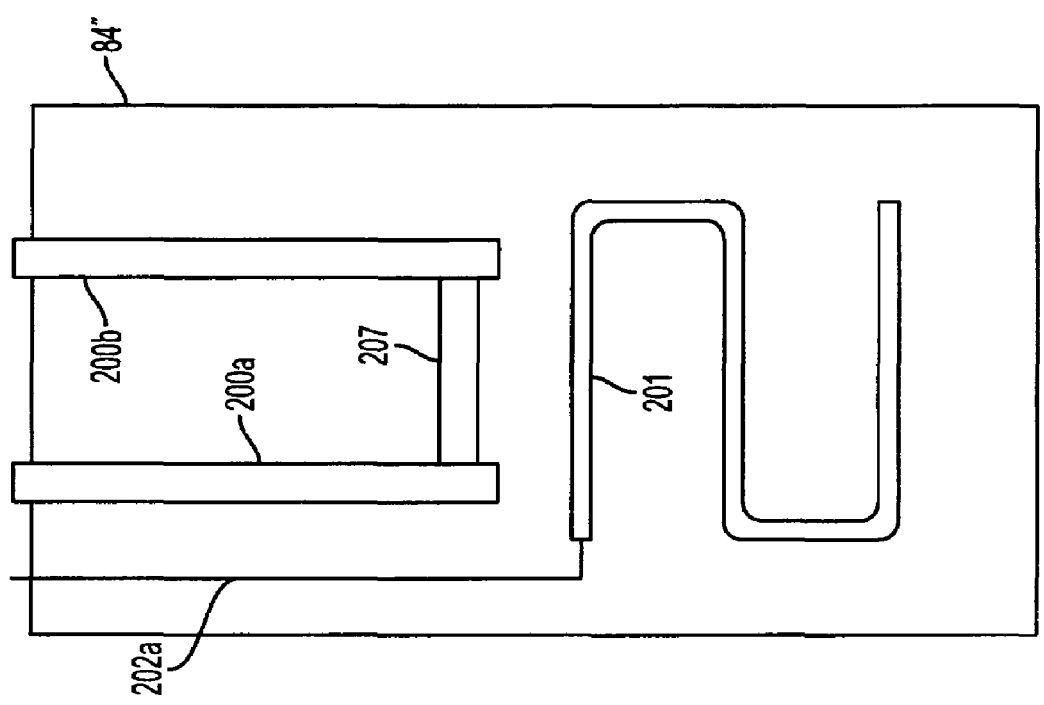
FIG. 12 is a partially schematic top view of an alternate arrangement of heating elements.

Returning to FIG. 7, upper mold assembly 30 includes conductor plates 92 and layers of insulating material 93 which are substantially the same as conductor plates 84 and layers insulating material 86 of lower mold assembly 31. Upper molds 32 and 33, heating elements 51*a*-51*d*, locators (not shown) similar to locators 49, conductor plates 92 and layers of insulating material 93 are arranged in the same manner as like elements in lower assembly 31. Brackets (not shown) similar to brackets 87 and 88 of FIG. 12 are used to hold together the components of upper mold assembly 30. In other embodiments, the components of the upper mold assembly are secured in other manners (e.g., using bolts similar to the embodiment shown in FIG. 11B). Heating elements 51*a*-51*d* operate in a manner similar to the heating elements of lower mold assembly 31 (as previously described in connection with FIG. 9). In particular, connectors 76*a* through 76*d* (FIG. 8) are wired to an electrical power supply. Electrical power is supplied via connectors 76*a*-76*d* to corresponding connectors on the ends (not shown) of heating elements 51*a* through 51*d*, which causes the heating elements in upper mold assembly 30 to produce heat.

As previously indicated, mold element 32 includes a protrusion 94 which fits within cavity 80 of mold 34, and which corresponds to the upper surface of a left shoe outsole. Mold 33 includes a protrusion 95 which fits into cavity 81 of mold 35, and which corresponds to the upper surface of a right shoe outsole. Molds 32 and 33 are also formed from steel, aluminum or other type of metal conventionally used for compression molds.

In other embodiments, the number and positions of heating elements under each mold is different. For example, molds for certain outsoles (or other shoe components) may require additional heat (or less heat) in certain regions. By way of illustration, a region of a mold may have a disproportionately larger mass of metal than is contained in other regions of the same mold. In order to evenly heat that mold to a desired temperature, additional and/or higher output heating elements may be needed in the regions having more metal mass. FIG. 12 shows a conductor plate 84'' and a plurality of heating elements according to at least one alternate embodiment. Conductor plate 84'' is positioned between a mold (not shown) and an insulating material layer (also not shown) in a manner similar to that of conductor plate 84 in FIGS. 3-5, 9 and 11A. Conductor plate 84'' may be of a one piece design (e.g., as in FIGS. 10A and 10C) or of a multipiece design (e.g., as in FIG. 10B). As can be appreciated, the embodiment of FIG. 12 permits adaptation of a molding system in order to accommodate differing internal mold geometries. In FIG. 12, heating elements 200*a* and 200*b* (separated by locator 207, which may alternately be omitted) are cartridge heaters similar to heating elements 50*a*-50*d* of FIG. 9, and have a relatively high heat output. Heating element 201 is a flexible heating element or a specially fabricated heating element which is similar to cartridge heaters previously discussed, but having the shape shown and a lower heat output. Heating element 201 is supplied with electrical power through electrical pathways (e.g., thermally and electrically insulated wires) 202. Heating elements 200a and 200b are supplied with electrical power through connectors on the ends of elements 200a and 200b extending beyond the end of conductor plate 84". As seen by comparing FIG. 12 with FIG. 9, the locations of power connections for the heating elements of FIG. 12 is different than for the arrangement of FIG. 9. Accordingly, bracket 57 of lower fixture 27 (see FIG. 4) could be replaced with a different bracket having electrical connectors in the proper locations for the arrangement of FIG. 12. Heating element 201 may also have differing electrical power requirements than heating elements 200a and 200b, and/or the may require a different type of electrical connector hardware. A replacement bracket could similarly be equipped with differing types of connector hardware.

The embodiment of FIG. 12 is but one example of a manner in which the number and positions of heating elements can be varied. As but another example, a spiral coil or other shape of heating element can be can be used in conjunction (with or instead of) cartridge heaters.

As can be appreciated, the above-described embodiments offer significant advantages over conventional compression molding arrangements, particularly with regard to molding footwear components. When molding large numbers of different types of articles (e.g., components for different styles and/or sizes of shoes), a large number of different molds are used. Some of these molds may have differing heating requirements because of, e.g., different mold geometries. Instead of attempting to adapt press platens to those different requirements, which may be difficult, separate mold assemblies (with separate heating element configurations) can be prepared for some or all of those molds.

Yet another advantage of at least some embodiments is shown in FIGS. 13A-13E. In FIGS. 13A-13E, a sequence of operations (using mold assemblies such as those described in connection with FIGS. 2-12) is shown. In the operations shown in FIGS. 13A-13E, there are multiple lower mold assemblies 31(1) and 31(2). Each of those lower mold assemblies mates with a single upper mold assembly 30. Although upper mold assembly 30 is not clearly shown in FIGS. 13A-13E, it is the same as upper assembly 30 described previously. Lower mold assemblies 31(1) and 31(2) are both the same as mold assembly 31 described previously, with a "(1)" or "(2)" suffix added to distinguish between the two lower assemblies.

Figure 13A:
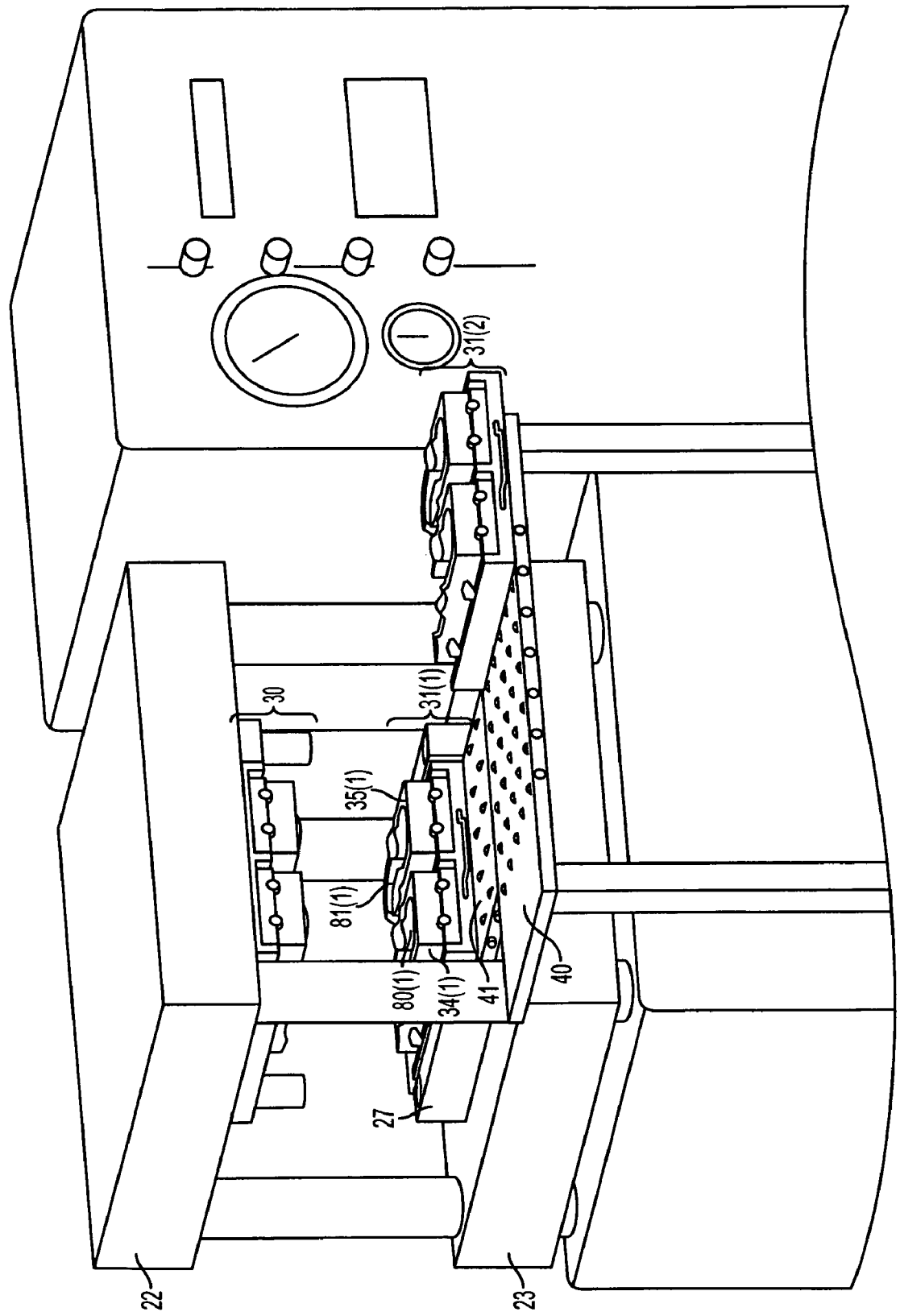
FIGS. 13A-13E illustrate a sequence of operations using mold assemblies such as those described in connection with previous drawing figures.
Figure 13B:
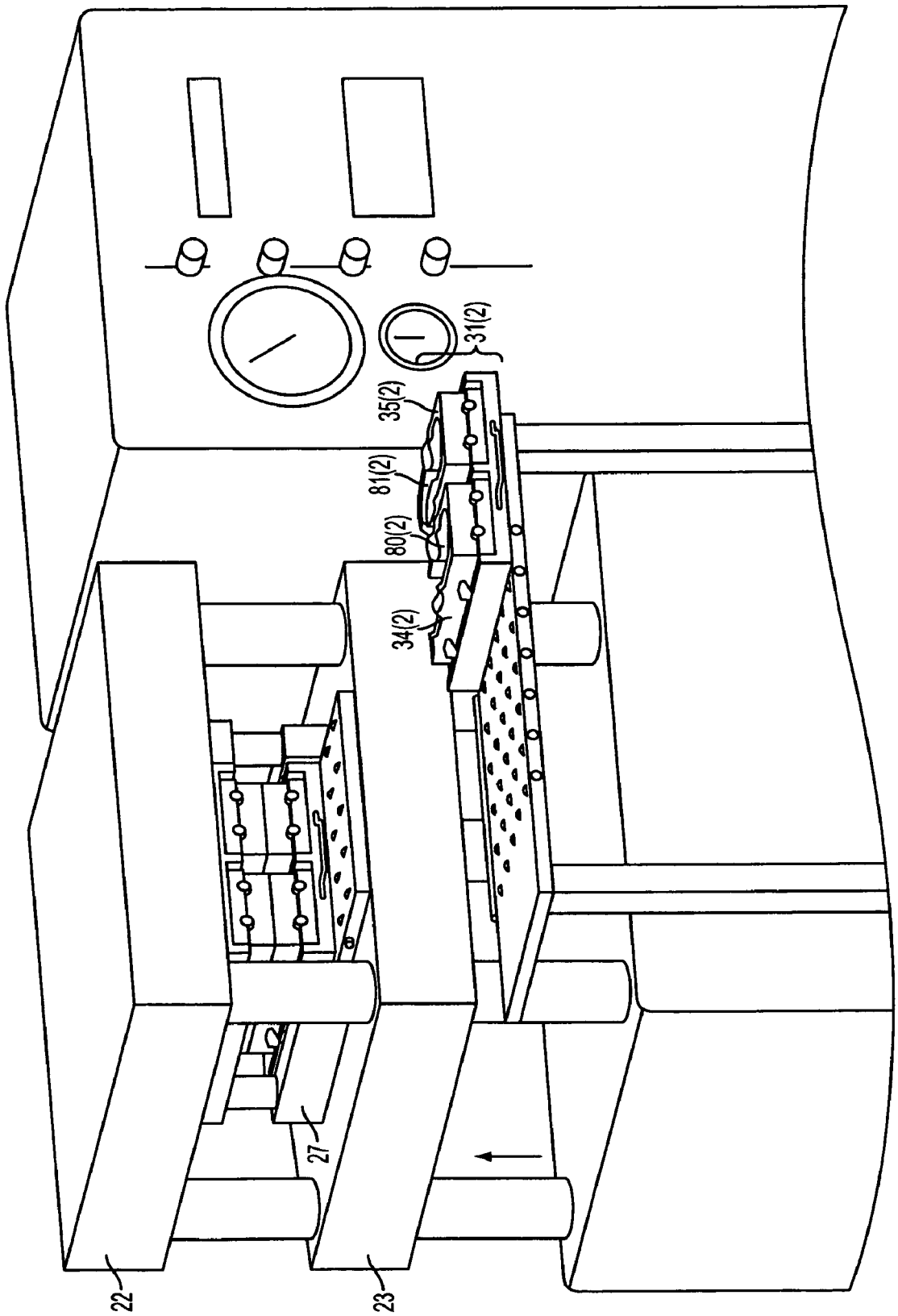

Beginning in FIG. 13A, an operator has already prepared lower mold assembly 31(1) by placing the raw materials in the proper locations within cavities 80(1) and 81(1) of molds 34(1) and 35(1). Lower mold assembly 31(1) was then slid along conveyors 40 and 41 into lower fixture 27. The connectors (not shown) on the rear ends of heating elements 50a(1)-50d(1) were attached to electrical connectors 60a-60d (not shown in FIG. 13A), and electrical power supplied to the heating elements of lower mold assembly 31(1) to heat molds 34(1) and 35(1). Upper molds 32 and 33 of upper assembly 30 are likewise heated by heating elements in upper assembly 30 (in some embodiments, a switch may be used to remove power from the upper molds between molding operations). Lower clamp plate 23 is then moved upward to engage the upper mold assembly 30 with lower mold assembly 31(1) (FIG. 13B).

Figure 13C:
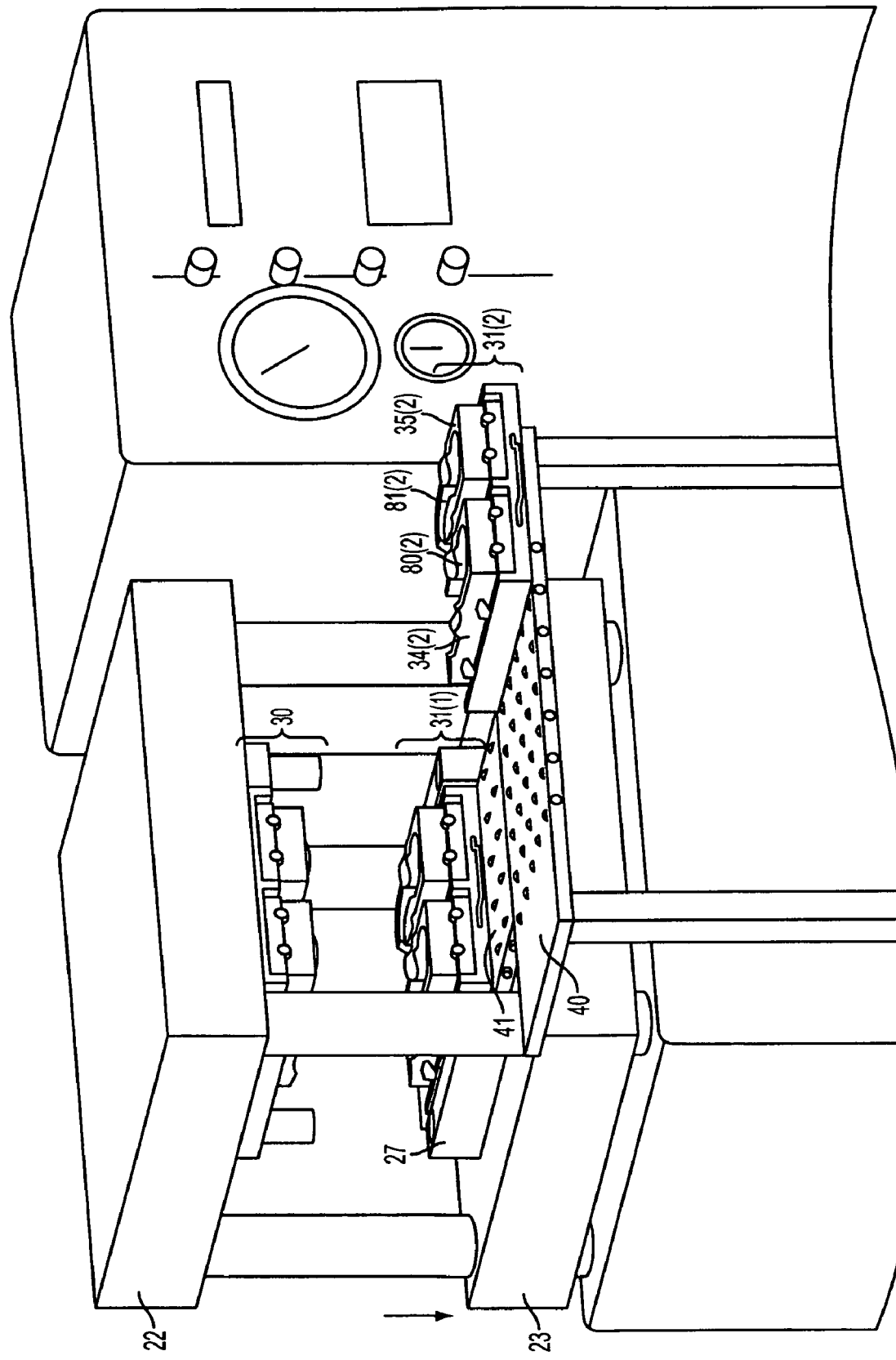
Figure 13D:
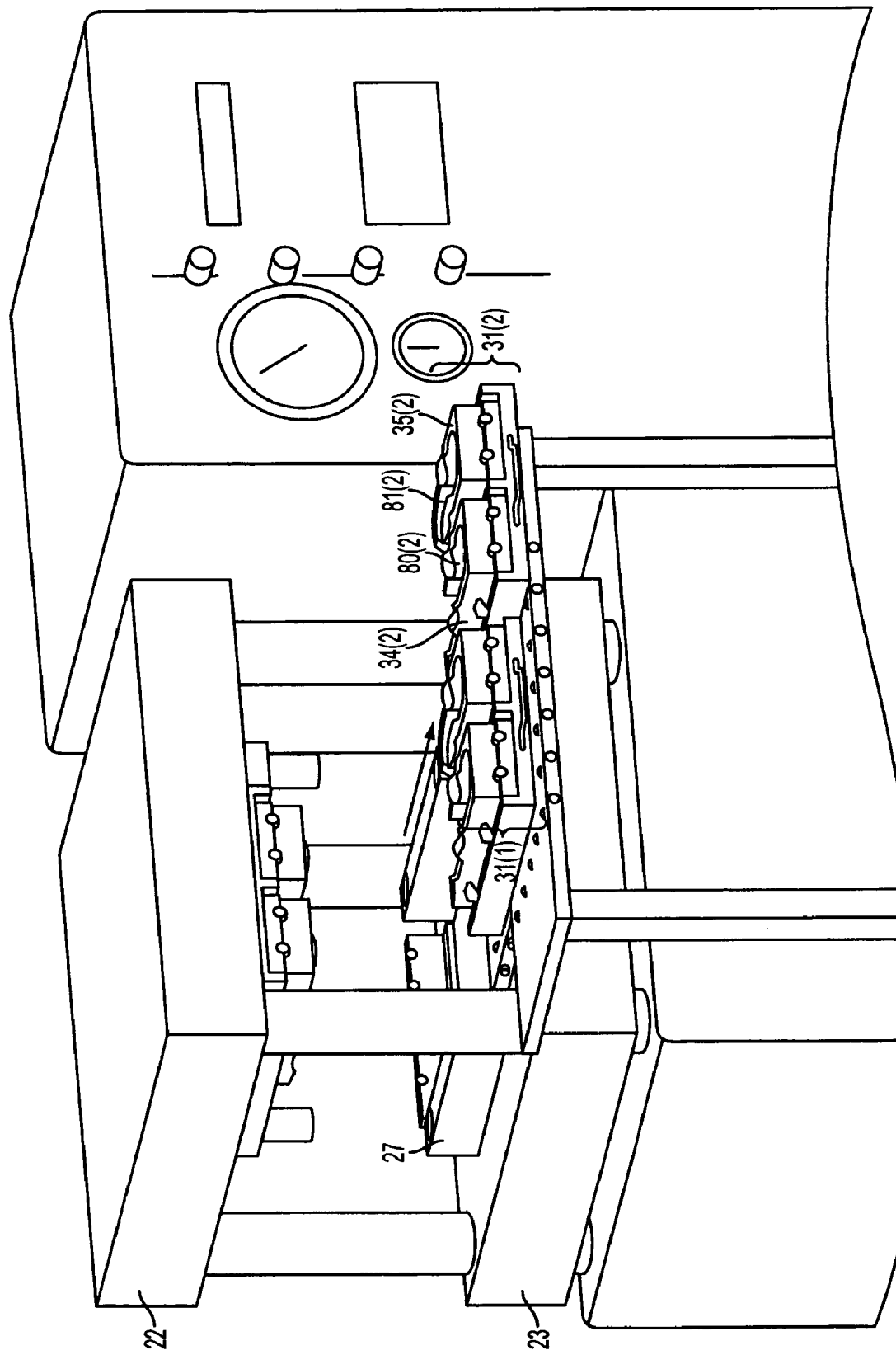
Figure 13E:
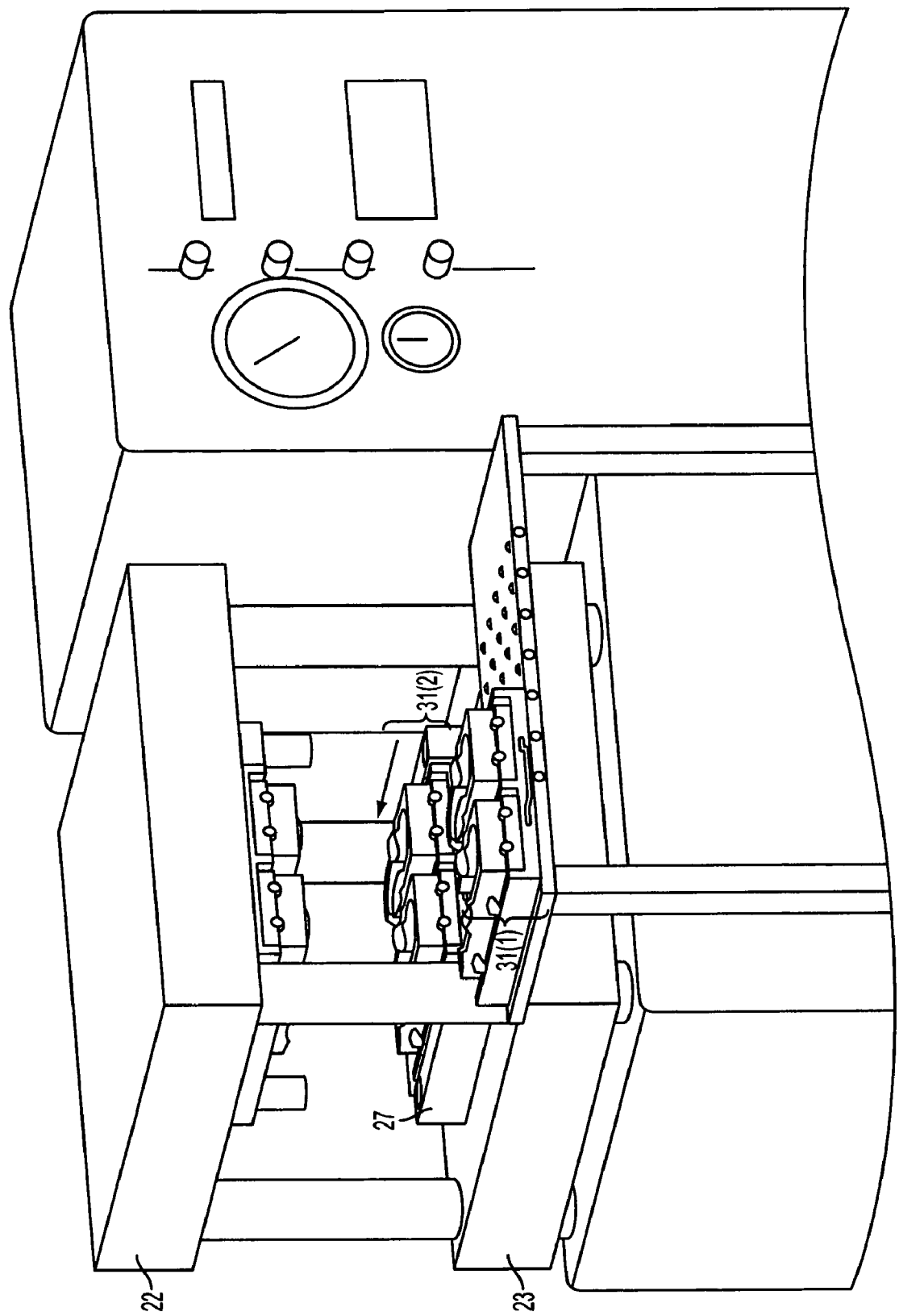

Once clamp plate 22 and 23 are pressed together, they remain in that condition for a predetermined amount of pressing time. In some cases, and depending upon the product being molded and/or the materials being used, this pressing time may be significant (several minutes or more). During this time, the operator may multitask and place raw materials in the proper locations within cavities 80(2) and 81(2) of molds 34(2) and 35(2) of lower mold assembly 31(2). After the appropriate mold pressing time, and as shown in FIG. 13C, lower clamp plate 23 is lowered. Lower mold assembly 31(1) is then removed from lower fixture 27 (FIG. 13D), and lower mold assembly 31(2) is moved into position within lower fixture 27 (FIG. 13E). Electrical connections are made to heating elements 50a(2)-50d(2), thereby causing molds 34(2) and 35(2) to be heated. At this stage, lower clamp plate 23 can be moved toward upper clamp plate 22 to press mold assemblies 31(2) and 30 together, and the operator can begin preparing the next lower mold assembly. In some cases, the operator may simply remove the just-molded components from lower mold assembly 31(1) and begin preparing lower mold assembly 31(1) for the next pressing. In other cases, there may be multiple additional lower mold assemblies.

Numerous other variations on the systems and operations described above will be apparent to persons skilled in the art in view of the description and drawings provided herein. As previously indicated, the invention is not limited to use in conjunction with molds for a particular type of article. The invention is similarly not limited to molds having geometries such as are shown in the drawings. In some cases, for example, the molds which join to create a mold volume will not include a protrusion on one of those molds. Instead, all of the molds may have a depression formed therein. The invention is also not limited to use in conjunction with systems where only two molds are joined to create a mold volume. As but one example, three molds could be configured so that those molds fit together to define a mold volume. Other types of heating elements could also be used, including elements which are powered by a source other than electricity. Other manners of attaching various components can be employed. As but one illustration thereof, peening could be employed (e.g., hammering a conductor plate, heating element, mold and/or tray to slightly bend the metal and retain other components). These and other variations and permutations of the above described devices and operations fall within the spirit and scope of the invention as set forth in the appended claims. It is to be understood that the subject matter defined in the appended claims is not necessarily limited to the specific features or acts described above. Rather, the specific features and acts described above are disclosed as example forms of implementing the invention as set forth in the claims.

The invention claimed is:

1. A system for molding articles, comprising:
   a first mold;
   a second mold;
   a first heating element, wherein
      the first and second molds are configured for placement between first and second press platens,
      the first and second molds cooperate to at least partially define a mold volume when pressed together between the first and second platens, and
      the first heating element is configured for placement between the platens and near the first mold, such that the first heating element heats the first mold when the first and second molds are pressed by the platens during multiple pressing operations;
   a first carrier, and wherein the first mold, the first heating element and the first carrier form a first mold assembly configured for placement between the first and second platens;

a second heating element;

a second carrier, and wherein the second mold, the second heating element and the second carrier form a second mold assembly configured for placement between the first and second platens;

a third mold;

a third heating element; and a third carrier, and wherein the third mold, the third heating element and the third carrier form a third mold assembly configured for placement between the first and second platens, the second and third molds cooperate to at least partially define a mold volume when pressed together between the first and second platens, the first and third mold assemblies are configured for sliding engagement with a fixture attached to the first platen.

2. The system of claim 1, wherein the mold volume at least partially defined by the first and second molds corresponds to a footwear component, and wherein the mold volume at least partially defined by the second and third molds corresponds to a footwear component.

3. The system of claim 1, further comprising a first conductor element, and wherein the first conductor element is formed from a material having a thermal conductivity value higher than a thermal conductivity value of a material from which the first mold is formed, the first conductor element is part of the first mold assembly, and the first conductor element is in contact with the first heating element and the first mold.

4. The system of claim 3, wherein the first conductor element has a contacting face that is adjacent to the first mold, the first mold has a contacting face that is adjacent to the first conductor element, and each of the contacting faces has at least one recess formed therein and receiving at least a portion of the first heating element.

5. The system of claim 3, wherein the first conductor element includes upper and lower layers, the upper layer has a contacting face that is adjacent to the lower layer, the lower layer has a contacting face that is adjacent to the upper layer, and each of the contacting faces has at least one recess formed therein and receiving at least a portion of the first heating element.

6. The system of claim 3, further comprising a first insulating element, and wherein the first insulating element is formed from a material having a thermal conductivity value lower than a thermal conductivity value of a material from which the first carrier is formed, the first insulating element is part of the first mold assembly, and the first insulating element is between the first conductor element and the first carrier.

7. The system of claim 1, further comprising first and second conductor elements, and wherein the first and second conductor elements are respectively formed from materials having thermal conductivity values higher than thermal conductivity values of materials from which the first and second molds are formed, the first conductor element is part of the first mold assembly, the first conductor element is in contact with the first heating element and the first mold, the second conductor element is part of the second mold assembly, and the second conductor element is in contact with the second heating element and the second mold.

8. The system of claim 1, further comprising:

a press; and at least one conveyor, and wherein the first and second platens are part of the press, the first platen having a pressing position in which the first and second platens are moved together to press the second mold with one of the first or third molds and a withdrawn position in which the first platen is moved away from the second platen, and the conveyor is positioned to receive one of the first and third mold assemblies from, and to transfer one of the first and third mold assemblies to, the first platen when the first platen is in the withdrawn position.

9. The system of claim 8, wherein the fixture includes at least one electrical contact, the at least one electrical contact is positioned to form an electrical connection with the first heating element when the first carrier is slidingly engaged in the fixture, and the at least one electrical contact is positioned to form an electrical connection with the third heating element when the third carrier is slidingly engaged in the fixture.

10. The system of claim 1, wherein the first heating element is positioned in the first carrier such that a portion of the first heating element is engageable with an electrical power connection when the first mold assembly is engaged with the fixture on the first platen, and wherein the third heating element is positioned in the third carrier such that a portion of the third heating element is engageable with the electrical power connection when the third mold assembly is engaged with the fixture on the first platen.

11. The system of claim 1, wherein the first heating element, the first mold and the first carrier are separate components assembled to form the first mold assembly and are configured for non-destructive disassembly.

12. The system of claim 3, wherein the first heating element, the first mold, the first carrier and the first conductor element are separate components assembled to form the first mold assembly and are configured for non-destructive disassembly.

13. The system of claim 5, wherein the first heating element, the first mold, the first carrier, the first conductor element upper layer and the first conductor element lower layer are separate components assembled to form the first mold assembly and are configured for non-destructive disassembly.

14. The system of claim 6, wherein the first heating element, the first mold, the first carrier, the first conductor element and the first insulating element are separate components assembled to form the first mold assembly and are configured for non-destructive disassembly.

15. The system of claim 10, wherein the first heating element, the first mold and the first carrier are separate components assembled to form the first mold assembly configured for non-destructive disassembly.

* * * * *

UNITED STATES PATENT AND TRADEMARK OFFICE
CERTIFICATE OF CORRECTION

PATENT NO. : 7,556,492 B2
APPLICATION NO. : 11/269848
DATED : July 7, 2009
INVENTOR(S) : Todd A. Waatti It is certified that error appears in the above-identified patent and that said Letters Patent is hereby corrected as shown below:

In Column 12, Claim 15, Line 62:
    Please insert the words --and are-- between "assembly" and "configured"

Signed and Sealed this

Twenty-second Day of December, 2009

David J. Kappos
*Director of the United States Patent and Trademark Office*